(12) United States Patent
Murata et al.

(10) Patent No.: US 7,988,921 B2
(45) Date of Patent: Aug. 2, 2011

(54) HEXAGONAL-CELL HONEYCOMB CATALYZER FOR PURIFYING EXHAUST GAS

(75) Inventors: Masakazu Murata, Nagoya (JP); Yoshiyasu Andoh, Kakamigahara (JP); Shingo Nakata, Kariya (JP); Tomoaki Nakano, Toyota (JP); Akimasa Hirai, Kakegawa (JP); Kenichi Taki, Kakegawa (JP); Yuji Yabuzaki, Kakegawa (JP)

(73) Assignees: Denso Corporation, Kariya (JP); Cataler Corporation, Kakegawa-shi (JP)

( * ) Notice: Subject to any disclaimer, the term of this patent is extended or adjusted under 35 U.S.C. 154(b) by 602 days.

(21) Appl. No.: 12/168,456

(22) Filed: Jul. 7, 2008

(65) Prior Publication Data

US 2009/0010815 A1 Jan. 8, 2009

(30) Foreign Application Priority Data

Jul. 6, 2007 (JP) ................................ 2007-178753

(51) Int. Cl.
*F01N 3/10* (2006.01)
(52) U.S. Cl. ........ 422/171; 422/177; 422/182; 422/183; 60/300; 60/301
(58) Field of Classification Search .................. 422/171, 422/177, 287; 60/300, 301
See application file for complete search history.

(56) References Cited

U.S. PATENT DOCUMENTS

| 5,538,697 | A | * | 7/1996 | Abe et al. ................ 422/171 |
| 5,662,869 | A | | 9/1997 | Abe |
| 5,845,492 | A | | 12/1998 | Isobe |
| 5,887,422 | A | | 3/1999 | Abe |
| 5,974,792 | A | | 11/1999 | Isobe |
| 6,421,915 | B1 | * | 7/2002 | Ichikawa ................ 29/890 |
| 6,444,610 | B1 | | 9/2002 | Yamamoto |
| 6,767,855 | B2 | * | 7/2004 | Kasahara et al. ........ 502/66 |
| 7,229,596 | B2 | * | 6/2007 | Ito et al. ................ 422/177 |
| 7,863,217 | B2 | * | 1/2011 | Minoshima et al. ...... 502/304 |
| 2001/0002538 | A1 | * | 6/2001 | Katsuta et al. .......... 60/284 |

FOREIGN PATENT DOCUMENTS

| EP | 0 909 579 | 4/1999 |
| JP | 06-185343 | 7/1994 |
| JP | 09 088564 | 3/1997 |
| JP | 09 228828 | 9/1997 |
| JP | 11-179158 | 7/1999 |
| JP | 2001-079423 | 3/2001 |

* cited by examiner

*Primary Examiner* — N. Bhat
(74) *Attorney, Agent, or Firm* — Nixon & Vanderhye PC

(57) ABSTRACT

A hexagonal-cell honeycomb catalyzer is for purifying an exhaust gas. The catalyzer comprising a support that has a plurality of cells and a purification layer that has an HC absorption layer and a three-way catalyst layer. The HC absorption layer is formed on the honeycomb-formed surface of each wall of the support. The three-way catalyst layer is formed on the surface of the HC absorption layer. Provided that the HC absorption layer has a thickness $a1$ and the three-way catalyst layer has a thickness $b1$ at a thin portion of the purification layer of which thickness is minimum and the HC absorption layer has a thickness $a2$ and the three-way catalyst layer has a thickness $b2$ at a thick portion of the purification layer of which thickness is maximum, a ratio of $a1/b1$ and a ratio of $a2/b2$ are both within a range of 1/20 to 5/1.

20 Claims, 6 Drawing Sheets

HEXAGONAL-CELL HONEYCOMB CATALYZER FOR PURIFYING EXHAUST GAS

CROSS REFERENCES TO RELATED APPLICATIONS

Figure 1:
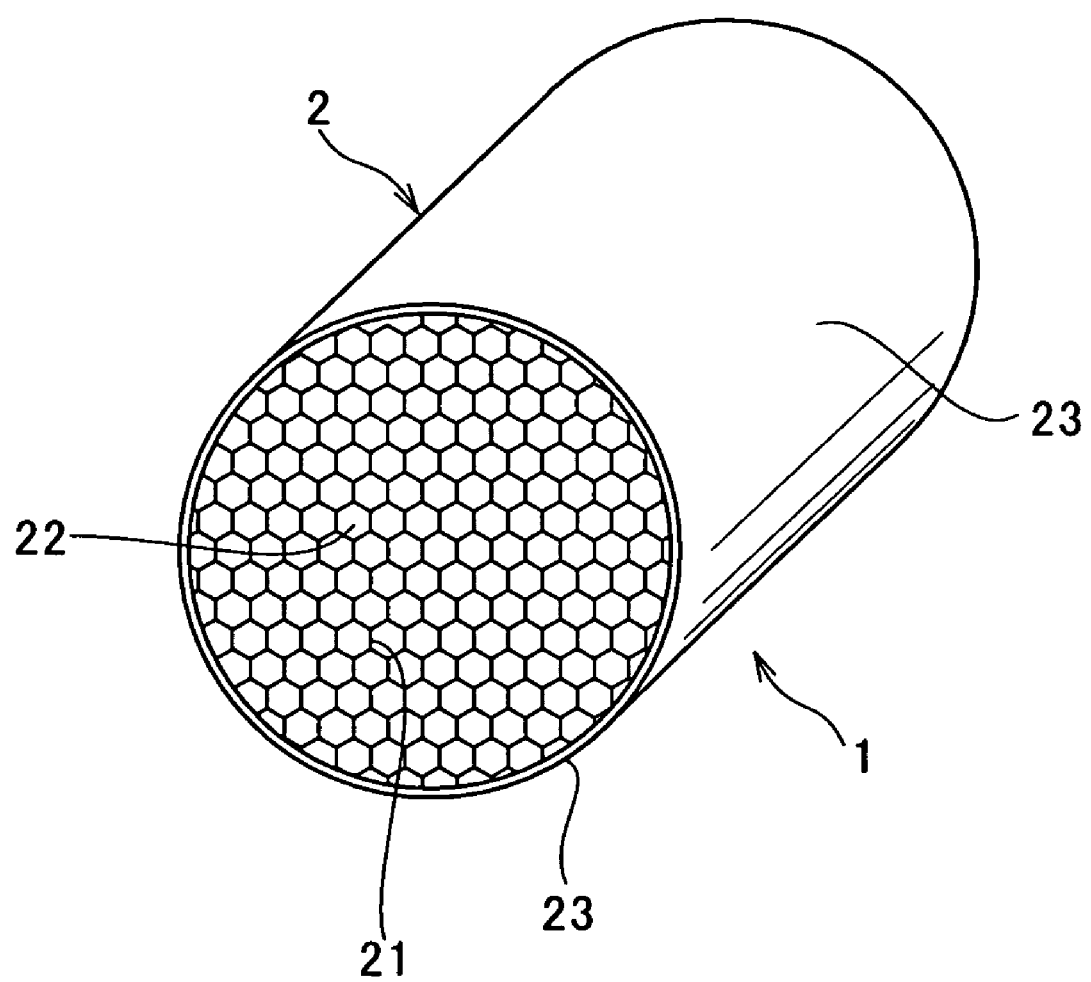

The present application relates to and incorporates by reference Japanese Patent Application No. 2007-178753 filed on Jul. 6, 2007.

BACKGROUND OF THE INVENTION

1. Field of the Invention

The present invention relates to a hexagonal-cell honeycomb catalyzer for purifying an exhaust gas from internal combustion engines mounted in for example vehicles and an exhaust gas purifying apparatus equipped with the hexagonal-cell honeycomb catalyzer.

2. Description of the Related Art

In recent years, systems for purifying an exhaust gas from internal combustion engines, such as on-vehicle engines, have been used for environmental measures. One of this kind of systems, a catalytic converter system is known, in which a support that carries catalytic materials including noble metal is arranged to an exhaust pipe. The support purifies HC (hydrocarbon), CO (carbon monoxide), NOx (nitrogen oxides), and other components in the exhaust gas by performing an oxidation reaction or oxidation-reduction reaction.

In general, this catalytic converter system is a honeycomb-shaped support (hereinafter referred to as "honeycomb support") having a large number of cells. The honeycomb support, which is made up of ceramics, has cells into each of which a catalyzer is applied. The catalyzer has a catalyst layer containing catalytic materials.

It has been known that a large amount of HC is exhausted when an internal combustion engine starts, because of its lower temperatures. In view of purifying this HC, Japanese Patent Nos. 3489049 and 3311051 and Japanese Patent Laid-open Publication Nos. 11-179158 and 9-228828 disclose a structure in which HC absorption materials, such as zeolite, are added to the catalyst layer.

Of these publications, Japanese Patent Laid-open Publication No. 11-179158 proposes a catalyzer provided with a honeycomb support which has an HC absorption material layer essentially made up of zeolite and a catalytic component layer, laminated on the HC absorption material layer, containing catalytic components (materials) such as noble metal. In this catalyzer, the HC is absorbed by the zeolite in a period during which an internal combustion engine is just started, and its temperature is not high to cause the catalytic component to be activated sufficiently. The temperature of the exhaust gas will rise gradually after the engine start, whereby the catalytic component becomes activated to purify the HC desorpted from the zeolite.

However, the above catalyzer specification with the catalyst layer made up of the absorption and purification layers is still silent about how both the two layers should be best supported for efficiently purifying the HC in the exhaust gas during the engine start.

The honeycomb support, which supports the catalyst layer and others, has cells each of various shapes such as a square or a hexagon. Compared to the honeycomb support with the square cells, the honeycomb support with the hexagonal cells (hereinafter referred to as a "hexagonal-cell honeycomb support") is advantageous in that the latter support provides a lower pressure loss, more improvement in purification by enlarging the support area of the catalyst layer, more even support of the catalyst layer, and others.

In such circumstances, such a catalyzer has been desired, which uses a hexagonal-cell honeycomb support as a base member, the support being provided with two layers, that is, a layer for absorbing HC and a layer for purifying HC using catalytic materials (hereinafter referred to as a "hexagonal-cell honeycomb catalyzer"), and which is able to efficiently purify HC in the exhaust gas when an internal combustion engine is started.

SUMMARY OF THE INVENTION

The present invention has been made in light of the problems described above and has as its object to provide a hexagonal-cell honeycomb catalyzer which, in particular, is able to efficiently purify HC in an exhaust gas.

In order to achieve the above object, as a first mode, there is provided a hexagonal-cell honeycomb catalyzer for purifying an exhaust gas, the catalyzer comprising: a support that has a plurality of cells each divided by a wall, the support having an axial direction, each wall having a honeycomb-formed surface in section perpendicular to the axial direction, each cell being combined to each other as the support; and a purification layer that has an HC absorption layer which is formed on the honeycomb-formed surface of the wall to have a surface and which includes an HC absorbing material, the HC being included in the exhaust gas; and a three-way catalyst layer which is formed on the surface of the HC absorption layer and which includes a catalytic material. In this configuration, provided that the HC absorption layer has a thickness a1 and the three-way catalyst layer has a thickness b1 at a thin portion of the purification layer at which its thickness is minimum and the HC absorption layer has a thickness a2 and the three-way catalyst layer has a thickness b2 at a thick portion of the purification layer at which its thickness is maximum, a ratio of a1/b1 and a ratio of a2/b2 are both within a range of 1/20 to 5/1.

The hexagonal-cell honeycomb catalyzer of the present invention has the hexagonal-cell honeycomb support. The surface of the cell wall of the hexagonal-cell honeycomb support is provided with the catalytic purification layer which is structured by sequentially stacking the HC absorption layer containing an HC absorption material and the three-way catalyst layer containing catalytic materials. Thus, HC in the exhaust gas can be absorbed by the HC absorption layer, which exhaust gas is discharged in large quantity in a low-temperature area at the time of starting an internal combustion engine. After that, HC that has desorbed from the HC absorption layer with the temperature rise of the exhaust gas can be purified by the three-way catalyst layer that has been brought into a catalytic active state.

In the present invention, the ratio between the thickness 1$a$ of the HC absorption layer and the thickness b2 of the three-way catalyst layer in the thin portion, i.e. (a1/b1), and the ratio between the thickness 2$a$ of the HC absorption layer and the thickness b2 of the three-way catalyst layer in the thick portion, i.e. (a2/b2), both fall within the range of 1/20 to 5/1.

By permitting the ratios of the layers in the catalytic purification layer to fall within the above specific range, the temperature of the three-way catalyst layer can be permitted to reach the catalyst-active temperature, by the time the temperature of the HC layer has reached the temperature at which HC desorption is started. In other words, by the time HC desorbs, the three-way catalyst layer can be brought into an active state as a catalyst. Thus, HC that has desorbed from the HC absorption layer can be efficiently purified by the three-way catalyst layer.

By permitting the ratios of the layers in the catalytic purification layer to fall within the above specific range, the balance can be optimized between the HC absorption performance of the HC absorption layer and the emission purification performance of the three-way catalyst layer. In other words, the three-way catalyst layer can ensure the emission purification performance for sufficiently purifying the amount of HC absorbed by the HC absorption layer. Thus, HC that has desorbed from the HC absorption layer can be efficiently purified by the three-way catalyst layer, whereby unpurified HC can be suppressed from being discharged.

As will be described later, the thick portions of the catalytic purification layer correspond to the portions of the catalytic purification layer, which are formed at the corners of the hexagonal cell. In each of these portions, the difference in the thicknesses of the HC absorption layer and the three-way catalyst layer tends to be large. Thus, by controlling the ratio of the thicknesses of the layers, the above advantage can be particularly effectively exerted, i.e. the advantage of appropriately balancing the absorption performance of the HC absorption layer and the emission purification performance of the three-way catalyst layer.

As described above, the present invention can provide the hexagonal-cell honeycomb catalyzer which is able to efficiently purify HC in the exhaust gas at the time of starting the internal combustion engine.

It should be appreciated that the thin portion of the catalytic purification layer mentioned above refers to the portion where the thickness of the catalytic purification layer is minimized in a radial cross section of the hexagonal-cell honeycomb catalyzer. Specifically, the thin portion corresponds to a portion of the catalytic purification layer, which falls on a straight line perpendicularly drawn from the center of the cell to a side constituting the cell (corresponding to the surface of the cell wall) (see FIG. 2 related to First Embodiment described later).

On the other hand, the thick portion of the catalytic purification layer mentioned above refers to the portion where the thickness of the catalytic purification layer is maximized in the radial cross section of the hexagonal-cell honeycomb catalyzer. Specifically, the thick portion corresponds to a portion of the catalytic purification layer, which falls on a straight line drawn from the center of the cell to the corner of the cell (see FIG. 2 related to First Embodiment described later).

A scanning electron microscope may be used to observe the radial cross section of the hexagonal-cell honeycomb catalyzer and to measure the thicknesses $a_1$ and $b_1$ of the HC absorption layer and the three-way catalyst layer, respectively, in the thin portion, and the thicknesses $a_2$ and $b_2$ of the HC absorption layer and the three-way catalyst layer, respectively, in the thick portion.

In the first invention, the hexagonal-cell honeycomb catalyzer purifies HC, CO, NOx and the like in the exhaust gas discharged from an internal combustion engine, such as a vehicle engine.

The ratio of the thickness $a_1$ of the HC absorption layer and the thickness $b_1$ of the three-way catalyst layer in the thin portion of the catalytic purification layer can be expressed by ($a_1/b_1$). Also the ratio of the thickness $a_2$ of the HC absorption layer and the thickness $b_2$ of the three-way catalyst layer in the thick portion of the catalytic purification layer can be expressed by ($a_2/b_2$). When ($a_1/b_1$) or ($a_2/b_2$) is less than 1/20, HC absorbed by and desorbed from the HC absorption layer may unlikely to be sufficiently purified by the three-way catalyst layer. On the other hand, when ($a_1/b_1$) or ($a_2/b_2$) exceeds 5/1, HC discharged in large quantity at the time of starting the internal combustion engine may unlikely to be sufficiently absorbed by the HC absorption layer.

In particular, it is preferred that the thickness $b_1$ of the three-way catalyst layer is 30 to 200 μm.

When the thickness $b_1$ of the three-way catalyst layer is less than 30 μm, the emission purification performance of the three-way catalyst layer may not be unlikely to be sufficiently ensured. On the other hand, when the thickness $b_1$ exceeds 200 μm, it takes long time for the three-way catalyst layer to reach the catalyst-active temperature. Thus, by the time HC desorbs, the three-way catalyst layer may be unlikely to be sufficiently active as a catalyst.

It is also preferred that the thickness $b_2$ of the three-way catalyst layer is 30 to 200 μm.

When the thickness $b_2$ of the three-way catalyst layer is less than 30 μm, the emission purification performance of the three-way catalyst layer might not be sufficiently ensured. On the other hand, when the thickness $b_2$ exceeds 200 μm, it takes long time for the three-way catalyst layer to reach the catalyst-active temperature. Thus, by the time HC desorbs, the three-way catalyst layer may be unlikely to be sufficiently active as a catalyst.

By way of example, the catalytic material of the three-way catalyst layer contains one or more noble metals selected from platinum, rhodium, and palladium. In this case, the emission purification performance of the three-way catalyst layer can be much enhanced. Thus, HC that has desorbed from the HC absorption layer lo can be more efficiently purified.

The HC absorbing material of the HC absorption layer may be zeolite. In this case, the absorption performance of the HC absorption layer can be much enhanced. Thus, HC can be more efficiently absorbed by the HC absorption layer.

Preferably, the HC absorption layer additionally contains an oxygen occlusion material.

The oxygen occlusion material has a function of occluding oxygen in an oxygen excessive atmosphere, and emitting oxygen in an oxygen deficient atmosphere. Thus, the oxygen occlusion material can optimize the oxygen conditions in the exhaust gas. Thus, in the course of purifying HC, for example, which requires oxygen, the exhaust gas can be prevented from being brought into oxygen deficient conditions. Accordingly, purification of HC or the like can be efficiently performed by the three-way catalyst layer.

Similar to the HC absorption layer, the three three-way catalyst layer may also contain the oxygen occlusion material. In this case, the advantage mentioned above can be enhanced.

Still preferably, the oxygen occlusion material is either cerium oxide or cerium/zirconium composite oxide. In this case, the oxygen conditions in the exhaust gas can be optimized to further exert the advantage of efficiently purifying CH or the like by the three-way catalyst layer.

Preferably, the HC absorption layer contains alumina. In this case, the high-temperature stabilization, durability and heat resistance of the HC absorption layer can be enhanced.

Similar to HC absorption layer, the three-way catalyst layer may also contain alumina. In this case, the advantage mentioned above can be further enhanced.

It also preferred that each hexagonal cell has a corner potion having a curved surface of a predetermined curvature. In this case, the strength of the hexagonal-cell honeycomb support can be enhanced. Also, the thickness can be prevented from being increased in the HC absorption layer and the three-way catalyst layer formed at the corners of the hexagonal cell.

For example, the support is made of ceramics essentially made of cordierite. Specifically, cordierite is a low-temperature expansion material having good thermal-shock resistance. Thus, durability and heat resistance can be enhanced in the hexagonal-cell honeycomb catalyzer.

The present invention provides, as a second mode, an emission purifying apparatus comprising: a catalyst for purifying an exhaust gas, the catalyst being arranged to an exhaust passage of an internal combustion engine; ignition timing calculation means for calculating an ignition timing based on an operated state of the internal combustion engine; fuel injection amount calculation means for calculating an amount of fuel to be injected based on the operated state of the internal combustion engine; warm-up detection means for detecting completion of a warm-up of the catalyzer; and catalyst early-warm-up control means for controlling, after start of the internal combustion engine, early warm-up of the catalyst until the warmed-up detection means detects the completion of the warm-up of the catalyst, wherein the catalyst early-warm-up detection means includes catalyst temperature rising means for accelerating temperature rise of the catalyst by correcting a delay angle of the ignition timing of the internal combustion engine from start of the catalyst early warm-up control, wherein the catalyst is composed of a hexagonal-cell honeycomb catalyzer for purifying an exhaust gas. The catalyzer adopts the configuration described in the first mode of the present invention.

The emission purifying apparatus of the present invention is provided with an catalyst early warm-up controlling means having a catalyst temperature raising means which corrects lag angle of the ignition timing of the internal combustion engine and accelerates the temperature rising of the catalyst.

The catalyst is the hexagonal-cell honeycomb catalyzer of the first invention, which is able to efficiently purify HC in the exhaust gas at the time of starting the internal combustion engine.

Thus, after starting the internal combustion engine, the emission purifying apparatus permits the catalyst temperature raising means to perform ignition lag angle control, whereby catalyst early warm-up control can be performed to warm-up the hexagonal-cell honeycomb catalyzer early. Accordingly, the temperature of the three-way catalyst layer of the hexagonal-cell honeycomb catalyzer can be raised up early to catalyst-active temperature. Thus, the emission purifying apparatus can efficiently purify HC in the exhaust gas at the time of starting the internal combustion engine.

In the second mode of the present invention, it is preferred that the catalyst temperature rising means is configured to accelerate the temperature rise of the catalyst by correcting the delay angle of the ignition timing of the internal combustion engine from the start of control of the catalyst and having a slightly lean air-fuel ratio. In this case, HC in the exhaust gas can be more efficiently purified when starting the internal combustion engine.

BRIEF DESCRIPTIONS OF THE DRAWINGS

Figure 2:
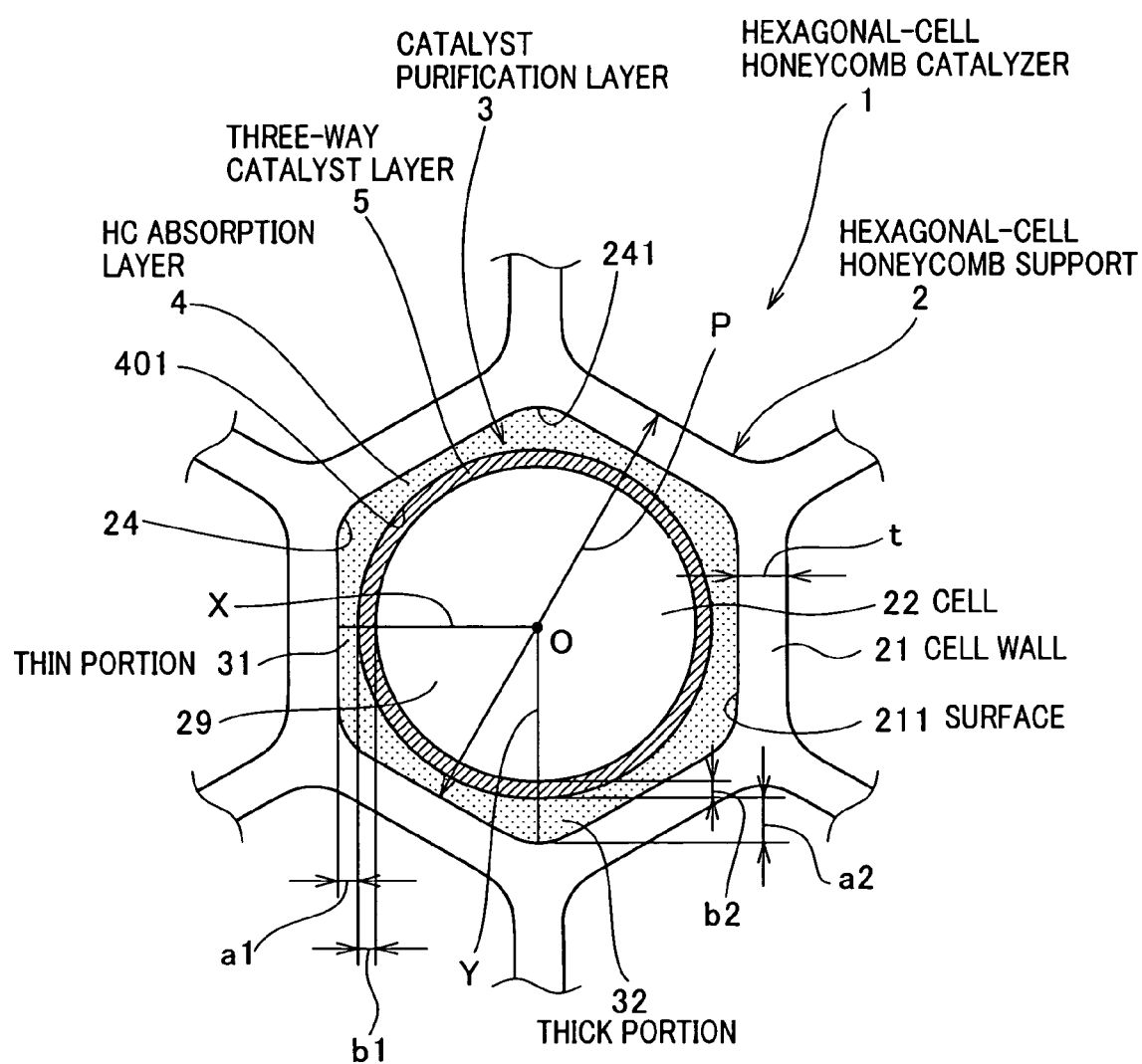
Figure 3:
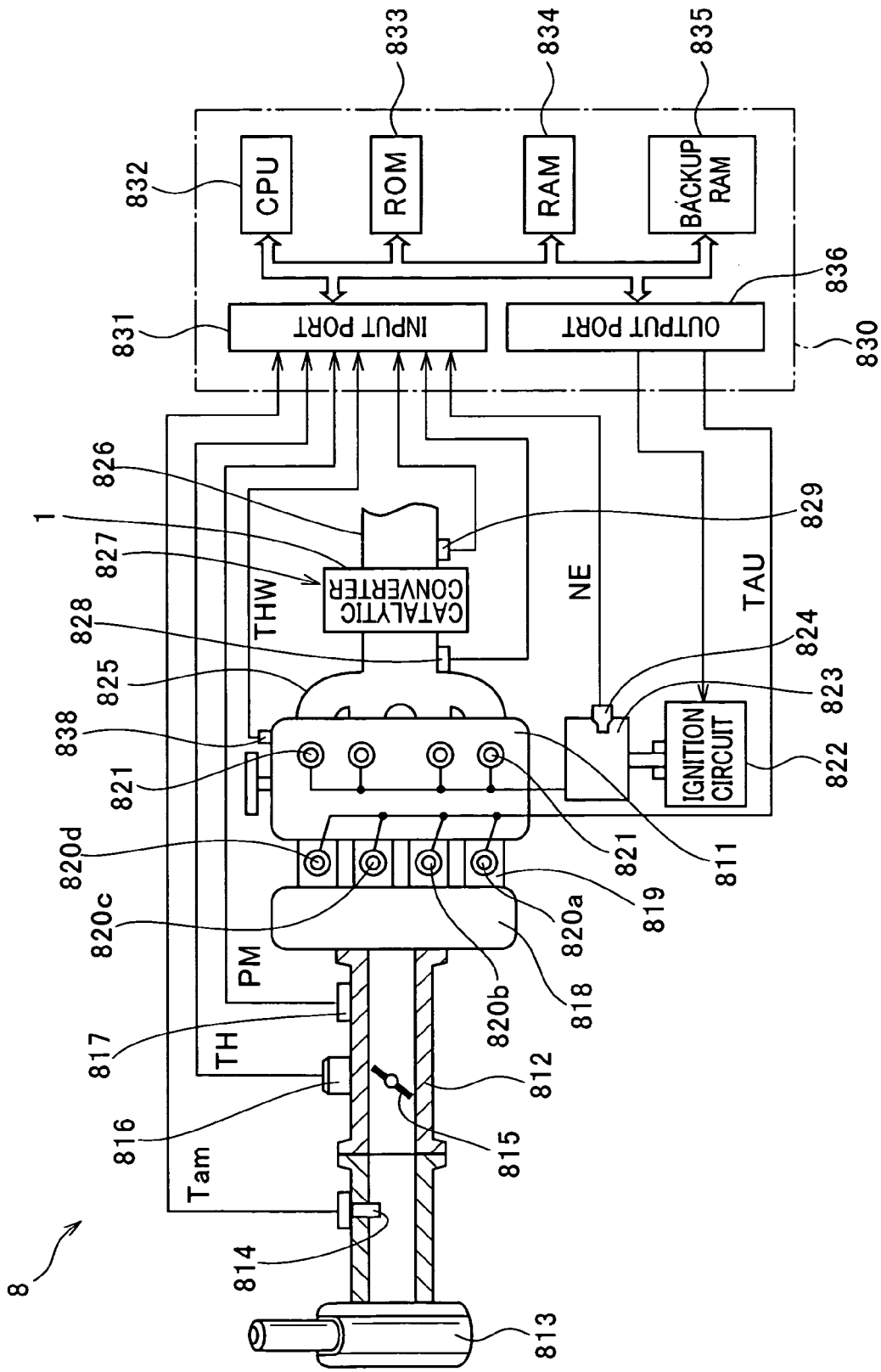
Figure 4:
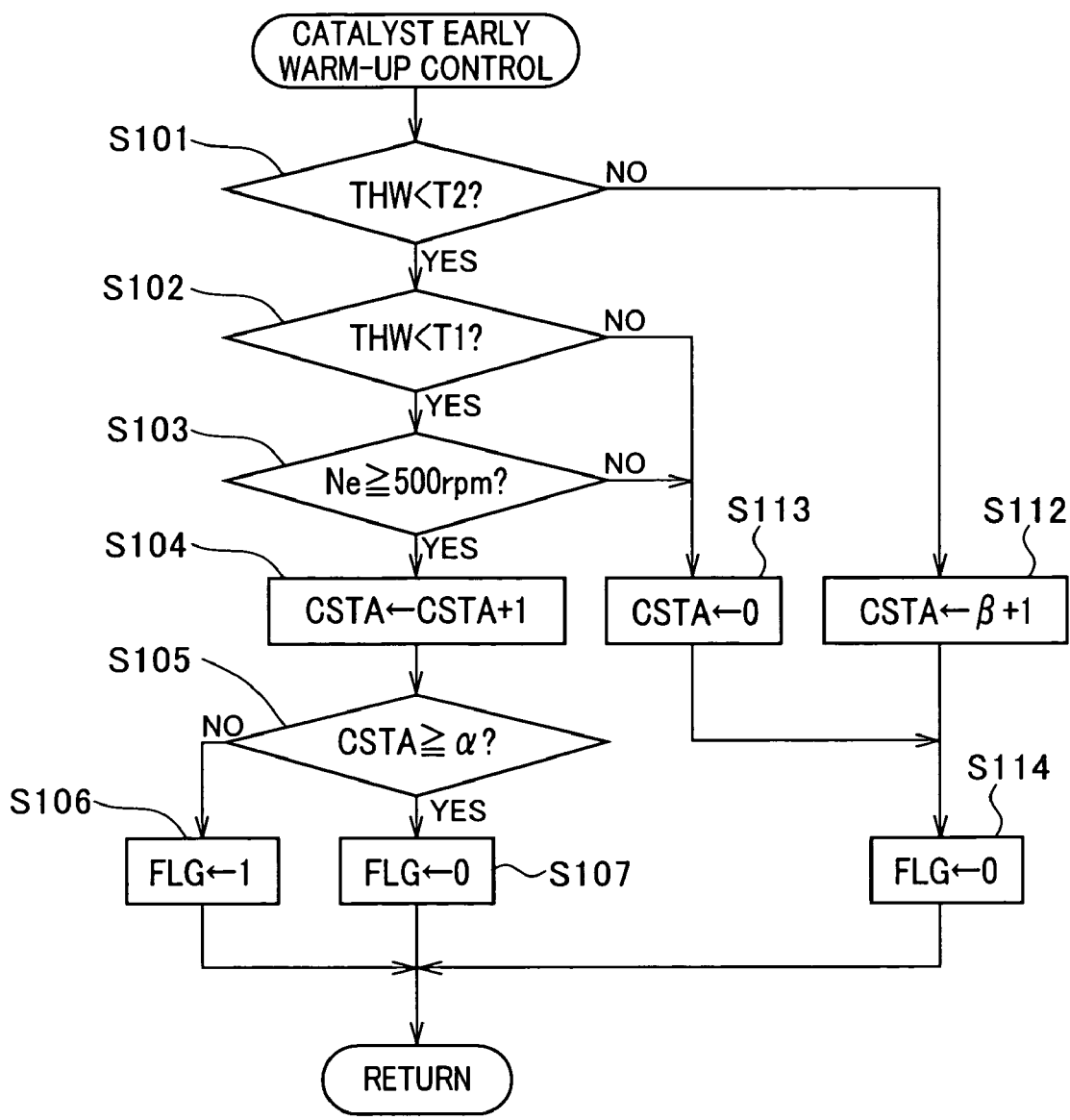
Figure 5:
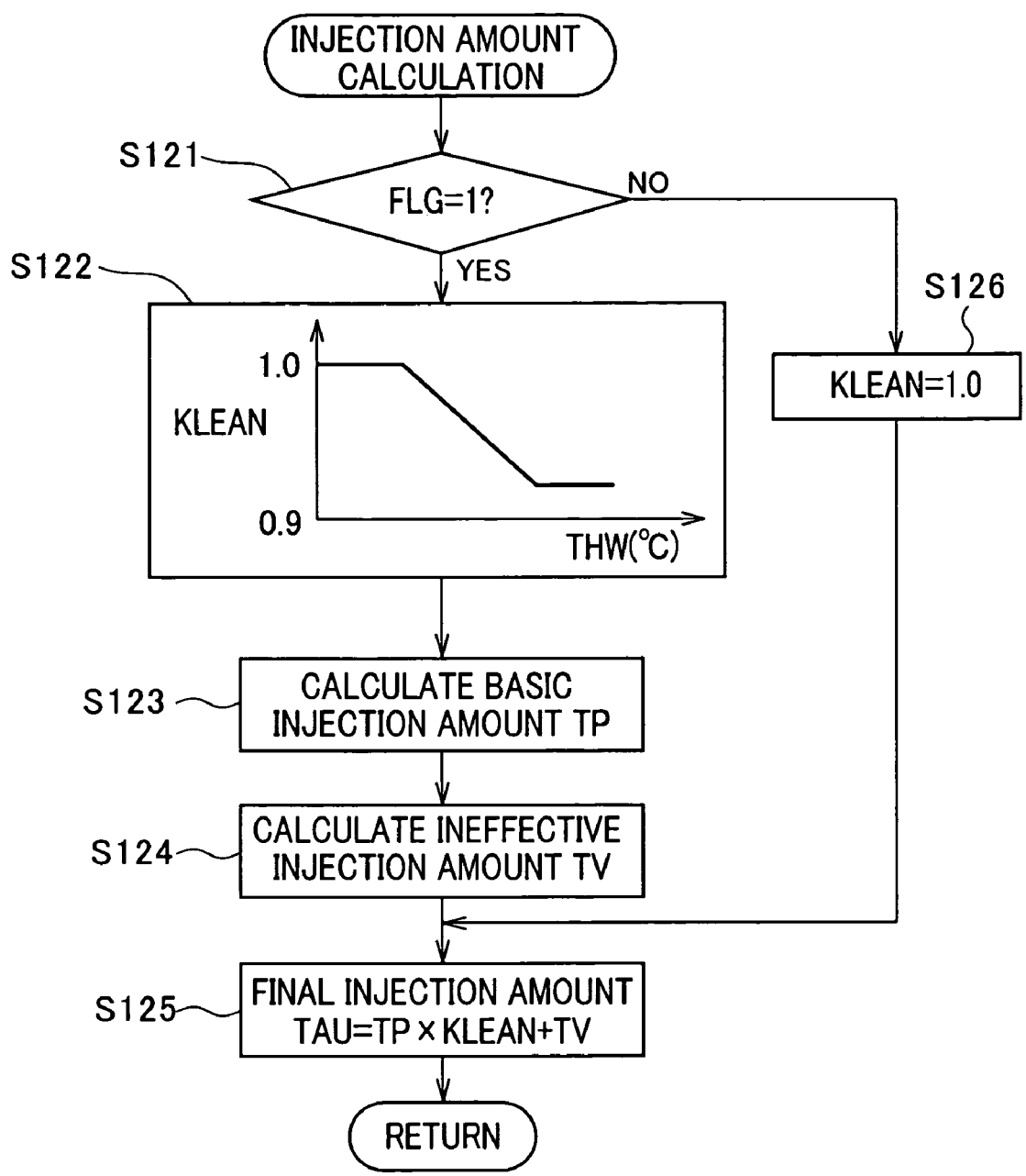
Figure 6:
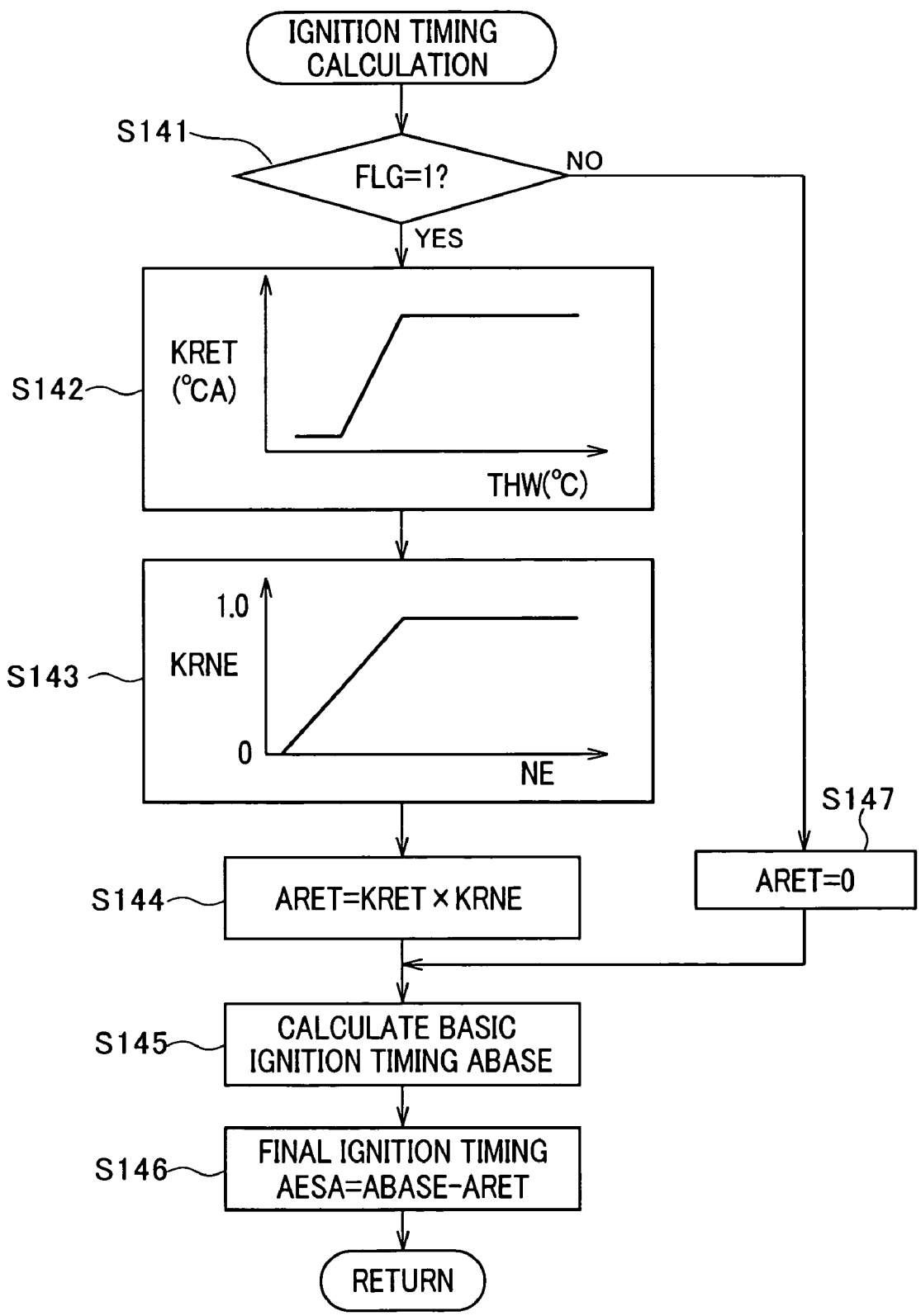

In the accompanying drawings:
FIG. 1 is an explanatory view illustrating a hexagonal-cell honeycomb catalyzer according to a first embodiment of the present invention;
FIG. 2 is an explanatory view illustrating a radial cross section of the hexagonal-cell honeycomb catalyzer according to the first embodiment;

FIG. 3 is an explanatory view illustrating a general configuration of an emission purifying apparatus, according to a second embodiment of the present invention;
FIG. 4 is a flow diagram illustrating a process flow of a catalyst early warm-up control routine according to the second embodiment;
FIG. 5 is a flow diagram illustrating a process flow of a fuel injection amount calculation routine according to the second embodiment; and
FIG. 6 is a flow diagram illustrating a process flow of an ignition timing calculation routine according to the second embodiment.

DETAILED DESCRIPTION OF THE PREFERRED EMBODIMENTS

First Embodiment

Hereinafter will be described a hexagonal-cell honeycomb catalyzer according to a first embodiment of the present invention.

As shown in FIGS. 1 and 2, a hexagonal-cell honeycomb catalyzer (i.e., catalyzing device) 1 of the present embodiment includes: a hexagonal-cell honeycomb support 2 having a hexagonal lattice-like cell wall 21, a plurality of hexagonal cells 22 enclosed by the cell wall 21, and a cylindrical skin layer 23 covering the outer peripheral face; and catalytic purification layers 3 each covering the surface of the cell wall 21 to purify an exhaust gas.

As shown in FIGS. 1 and 2, the catalytic purification layer 3 consists of an HC absorption layer 4 covering a surface 211 of the cell wall 21 and containing an HC absorption material, and a three-way catalyst layer 5 provided at a surface 401 of the HC absorption layer 4 and containing catalytic materials.

In FIG. 2, a reference a1 represents the thickness of the HC absorption layer 4 and reference b1 represents the thickness of the three-way catalyst layer 5, in a thin portion 31 where the thickness of the catalytic purification layer 3 is minimal. Further, reference a2 represents the thickness of the HC absorption layer 4 and reference b2 represents the thickness of the three-way catalyst layer 5, in a thick portion where the thickness of the catalytic purification layer is maximal. Then, relations expressed by (a1/b1) and (a2/b2) both fall within a range of 1/20 to 5/1.

Detailed description on the above is provided below.
As shown in FIG. 1, the hexagonal-cell honeycomb catalyzer 1 of the present embodiment is applied to a catalytic converter system, for example, for purifying HC, CO, NOx and the like in an exhaust gas discharged from a vehicle engine, for example.

The hexagonal-cell honeycomb support 2 functions as a catalyst support for supporting catalytic materials.

The hexagonal-cell honeycomb support 2 of the present embodiment is made of ceramics containing cordierite as a main component and has 800 meshes, or 800 cells, (per one square inch), with the diameter being 105.7 mm, the length being 114 mm and the capacity being 1 L (liter).

As shown in FIG. 2, each hexagonal cell 22 of the hexagonal-cell honeycomb support 2 has corners 24, each having a rounded face 241 with a predetermined curvature. The curvature radius "r" of the rounded face 241 in the present embodiment is 0.25 mm.

The hexagonal lattice-like cell wall 21 has a thickness "t" of 90 μm and a cell pitch "p" of 0.96 mm.

The catalytic purification layer 3 consists of the HC absorption layer 4 containing zeolite, a main component of an HC absorption material, and the three-way catalyst layer 5 containing catalytic materials. The HC absorption layer 4 and the three-way catalyst layer 5 are stacked, in this order, on the surface 211 of each cell wall 21.

Although not shown, the three-way catalyst layer 5 consists of a first catalyst layer containing palladium as a catalytic material and a second catalyst layer containing rhodium as a catalytic material. The first and second catalyst layers are stacked, in this order, on the surface 401 of the HC absorption layer 4.

Also, a substantially circular exhaust gas passage 29 is formed inside the catalytic purification layer 3 to pass an exhaust gas.

The HC absorption layer 4 contains cerium/zirconium composite oxide as an oxygen occlusion material, and alumina for enhancing durability and heat resistance.

The first and second catalyst layers of the three-way catalyst layer 5 contain cerium/zirconium composite oxide as an oxygen occlusion material, and alumina for enhancing durability and heat resistance.

In the first catalyst layer, palladium is supported by alumina, ceria/zirconia composite oxide and the like. In the second catalyst layer, rhodium is supported by alumina, ceria/zirconia composite oxide and the like.

In the present embodiment, as shown in FIG. 2, the thin portion 31 corresponds to a portion where the thickness of the catalytic purification layer 3 is minimized in the radial cross section of the hexagonal-cell honeycomb catalyzer 1. Specifically, the thin portion 31 corresponds to a portion of the catalytic purification layer 3, which falls on a straight line X perpendicularly drawn from a center O of the cell 22 to a side constituting the cell 22 (corresponding to the surface 211 of the cell wall 21).

On the other hand, as shown in FIG. 2 as well, the thick portion 32 of the catalytic purification layer 3 corresponds to a portion where the thickness of the catalytic purification layer 3 is maximized in the radial cross section of the hexagonal-cell honeycomb catalyzer 1. Specifically, the thick portion 32 corresponds to a portion of the catalytic purification layer 3, which falls on a straight line Y drawn from the center O of the cell 22 to the corner 24 of the cell 22.

In the present embodiment, measurements were made observing the radial cross section of the hexagonal-cell honeycomb catalyzer 1 using a scanning electron microscope, as to the thickness a1 of the HC absorption layer 4 and the thickness b1 of the three-way catalyst layer 5 in the thin portion 31, as well as the thickness a2 of the HC absorption layer 4 and the thickness b2 of the three-way catalyst layer S in the thick portion 32.

As shown in FIG. 2, in the thin portion 31 having the minimal thickness in the catalytic purification layer 3, the thickness a1 of the HC absorption layer 4 ranges from 10 to 150 μm, and the thickness b1 of the three-way catalyst layer 5 ranges from 30 to 200 μm, for example. In the thick portion 32 having maximal thickness in the catalytic purification layer 3, the thickness a2 of the HC absorption layer 4 ranges from 10 to 150 μm, and the thickness b2 of the three-way catalyst layer 5 ranges from 30 to 200 μm.

The thickness ratios of the HC absorption layer 4 and the three-way catalyst layer 5 expressed by the relations (a1/b1) and (a2/b2) both fall within the range of 1/20 to 5/1. This range was set based on experimental results. The experiment was performed by the inventors with changing the thicknesses of both the HC absorption layer and the three-way catalyst layer into various amounts including the above exemplified thicknesses. Basically, the thickness of the HC absorption layer has influence on an amount of HC to be absorbed. The thicker the HC absorption layer, the more the HC absorption amount. In cases where the HC absorption layer is thick, it is possible to suppress an amount of HC exhaust when starting the engine in a cool environment. However, when the HC absorption layer is excessively thick, the heat capacity thereof becomes larger. As a result, the HC absorption layer cannot become hot quickly, which makes the three-way catalyst layer reluctant to be activated, thus having a difficulty in purifying the desorpted HC. Meanwhile, the thickness of the three-way catalyst layer has influence on the dispersion of noble metal. A thicker three-way catalyst layer provides a higher dispersion, thus providing a higher sintering performance, providing higher durability. In contrast, when the thickness of the three-way catalyst layer becomes excessively larger, the heat capacity thereof becomes larger as well, thus being difficult to become hot in a short period of time. As a result, it is difficult to quickly activate the catalyst. Hence, through the experiment, the range of 1/20 to 5/1 was set in consideration of a balance between the above two factors.

Hereinafter is described a method for manufacturing the hexagonal-cell honeycomb catalyzer 1.

Fabricating the hexagonal-cell honeycomb support 2 as a base member includes a step of molding a honeycomb compact by subjecting a ceramics material to extrusion molding, a step of drying the honeycomb compact, and a step of baking the honeycomb compact.

In the molding step, an extrusion mold (not shown) having a slit groove corresponding to the shape of the cell wall 21, is used to perform the extrusion molding.

First, the ceramics material constituting the honeycomb compact is prepared. In the present embodiment, a base powder was used as the ceramics material, which base powder contains kaolin, talc, alumina and the like, which were adjusted so as to provide a chemical composition that would ultimately have cordierite as a main component. The ceramics material was obtained by adding predetermined amounts of water and a binder, such as methyl cellulose, to the base powder, followed by kneading.

Subsequently, the ceramics material prepared as described above was extrusion molded using the extrusion mold to mold a honeycomb compact (molding step). Then, the molded honeycomb compact was subjected to microwave drying (drying step), followed by baking at the maximum temperature of about 1400° C. (baking step). Thus, the hexagonal-cell honeycomb support 2 was obtained.

Then, the hexagonal-cell honeycomb support 2 obtained in this way was formed with the catalytic purification layer 3 consisting of the absorption layer 4 and the three-way catalyst layer 5.

First, 25 g (grams) of alumina powder, 25 g (grams) of cerium/zirconium composite oxide powder, 50 g of zeolite powder and a predetermined amount of deionized water were mixed to prepare slurry for molding the HC absorption layer. The slurry was then coated on the hexagonal-cell honeycomb support 2. After that, the resultant was dried for one hour at a temperature of 250° C., followed by baking for one hour at a temperature of 500° C. Thus, the HC absorption layer 4 was formed to cove the surface 211 of the cell wall 21 of the hexagonal-cell honeycomb support 2.

Then, 25 g of alumina powder, 25 g of cerium/zirconium composite oxide powder and palladium nitrate solution containing 1.5 g of palladium were mixed to prepare slurry for forming a first catalyst layer. The slurry was then coated on the hexagonal-cell honeycomb support 2. After that, the resultant was dried for one hour at a temperature of 250° C., followed by baking for one hour at a temperature of 500° C. Thus, the first catalyst layer was formed on the surface 401 of the HC absorption layer 4.

Then, 25 g of alumina powder, 25 g of cerium/zirconium composite oxide powder and rhodium nitrate solution containing 0.5 g of rhodium were mixed to prepare slurry for forming a second catalyst layer. The slurry was then coated on the hexagonal-cell honeycomb support 2. After that, the resulting structure was dried for one hour at a temperature of 250° C., followed by baking for one hour at a temperature of 500° C. Thus, the three-way catalyst layer 5 consisting so of the first catalyst layer and the second catalyst layer was formed on the surface 401 of the HC absorption layer 4.

As described above, the hexagonal-cell honeycomb catalyzer 1 was obtained, in which the catalytic purification layer 3 is formed by stacking the HC absorption layer 4 and the three-way catalyst layer 5, in this order, on the surface 211 of the cell wall 21 of the hexagonal-cell honeycomb support 2.

Hereinafter is described the advantages of the hexagonal-cell honeycomb catalyzer 1 of to the present embodiment.

According to the hexagonal-cell honeycomb catalyzer 1 of the present embodiment, HC in the exhaust gas discharged in large quantity in a low-temperature area in engine start is absorbed by the HC absorption layer 4. Then, as the temperature of the exhaust gas rises, HC that has desorbed from the HC absorption layer 5 is purified by the three-way catalyst layer 5 that has been brought into a catalytic active state.

In the present embodiment, the ratio between the thickness a1 of the HC absorption layer 4 and the thickness b1 of the three-way catalyst layer 5 in the thin portion 31, i.e. (b1/a1), and the ratio between the thickness a2 of the HC absorption layer and the thickness b2 of the three-way catalyst layer 5 in the thick portion 32, i.e. (b2/a2), are set to fall within a region of 1/20 to 5/1.

By permitting the ratios of the thicknesses of the layers in the catalytic purification layer 3 to fall within a specific range, by the time when the temperature of the HC absorption layer 4 has reached the temperature of starting desorption, the temperature of the three-way catalyst layer 5 can be permitted to reach a catalyst-active temperature. Specifically, by the time when HC desorbs, the three-way catalyst layer 5 can be in an active state as a catalyst. Accordingly, HC desorbed from the HC absorption layer 4 is efficiently purified by the three-way catalyst layer 5.

Also, by permitting the ratios of the thicknesses of the layers in the catalytic purification layer 3 to fall within a specific range, the HC absorption performance of the HC absorption layer 4 is well balanced with the emission purification performance of the three-way catalyst layer 5. Specifically, the three-way catalyst layer 5 is ensured to exert the emission purification performance which is sufficient for purifying the amount of HC absorbed by the HC absorption layer 4. Thus, HC that has been absorbed by and desorbed from the HC absorption layer 4 can be well purified by the three-way catalyst layer 5, whereby unpurified HC can be suppressed from being discharged.

The thick portions 32 of the catalytic purification layer 3 correspond to those portions of the catalytic purification layer 3, which are formed at the peaks of the hexagon of the hexagonal cell 22. In other words, in the catalytic purification layer 3, the thick portions 32 correspond to the portions formed at the corners 24 of each hexagonal cell 22. In these portions, the difference in the thickness tends to be large between the HC absorption layer 4 and the three-way catalyst layer 5. Thus, by controlling the ratio of the thicknesses between the layers, the above advantage can be particularly effectively exerted, that is, the advantage of appropriately balancing the HC absorption performance of the HC absorption layer 4 and the emission purification performance of the three-way catalyst layer 5.

In the present embodiment, the HC absorption layer 4 and the three-way catalyst layer 5 contain cerium/zirconium composite oxide as an oxygen occlusion material. The oxygen occlusion material has a function of occluding oxygen in an oxygen excessive atmosphere, and emitting oxygen in an oxygen deficient atmosphere. Thus, the oxygen occlusion material can optimize the oxygen conditions in the exhaust gas. Thus, in the course of purifying HC, for example, which course requires oxygen, the exhaust gas can be prevented from being brought into the oxygen deficient conditions. Accordingly, purification of HC or the like can be efficiently performed by the three-way catalyst layer 5.

The HC absorption layer 4 and the three-way catalyst layer 5 contain alumina. This may enhance the high-temperature stability, durability and heat resistance of the HC absorption layer 4 and the three-way catalyst layer 5.

The rounded face 241 having a predetermined curvature is provided at each of the corners 24 of the hexagonal cell 22. Thus, the strength of the hexagonal-cell honeycomb support 2 can be enhanced. Also, the thicknesses can be prevented from being increased in the HC absorption layer 4 and the there-way catalyst layer 5 at the corners 24 of the hexagonal cell 22, and better uniformity can be achieved in the thicknesses of both layers.

As described above, with the hexagonal-cell honeycomb catalyzer 1 according to the present embodiment, HC in the exhaust gas in engine start can be efficiently purified.

Second Embodiment

Referring to FIGS. 3-6, a second embodiment of the present invention will now be described.

In the present embodiment, the identical or similar components to those in the first embodiment are given the same reference numerals for the sake of omitting explanation.

FIG. 3 shows an example in which the hexagonal-cell honeycomb catalyzer 1 of the first embodiment is applied to an emission purifying apparatus 8.

As shown in FIG. 3, the emission purifying apparatus of the present embodiment includes an exhaust pipe 826 and a catalytic converter 827. The catalytic converter 827 is provided with the hexagonal-cell honeycomb catalyzer 1.

Hereinafter, the emission purifying apparatus 8 will be described in detail.

Referring to FIG. 3 first, the general configuration of the emission purifying apparatus 8 is explained.

An air cleaner 813 is provided at a most upstream portion of an intake pipe 812 of an engine 811, an internal combustion engine. An intake air temperature sensor 814 for detecting an intake air temperature Tam is provided downstream of the air cleaner 813. A throttle valve 815 and a throttle opening sensor 816 for detecting a throttle opening TH are provided downstream of the intake air temperature sensor 814. Further, an intake pipe pressure sensor 817 for detecting an intake pipe pressure PM is provided downstream of the throttle valve 815. A surge tank 818 is provided downstream of the intake pipe pressure sensor 817. An intake manifold 819 for introducing air to the cylinders of the engine 811, is connected to the surge tank 818. Injectors 820a to 820d for injecting fuel are attached to the branched pipe portions of the respective cylinders of the intake manifold 819.

Ignition plugs 821 are attached to the respective cylinders of the engine 811. High-pressure current is generated by an ignition circuit 822 and supplied to each of the ignition plugs 821 via a distributor 823. The distributor 823 is provided with a crank angle sensor 824 which outputs 24 pulses, for example, for every 720° CA (two rotations of crank shaft). An engine speed NE is adapted to be detected based on the output pulse interval of the crank angle sensor 824. Further, a water temperature sensor 838 for detecting an engine cooling water temperature THW is attached to the engine 811.

On the other hand, an exhaust pipe 826 (exhaust path) is connected to an exhaust port (not shown) of the engine 811 via an exhaust manifold 825. The catalytic converter 827 is provided midway of the exhaust pipe 826. The catalytic converter 827 is provided therein with the hexagonal-cell honeycomb catalyzer 1 for reducing the harmful components (e.g., CO, HC and NOx) in the exhaust gas. An air-fuel ratio sensor 828 is provided upstream of the catalytic converter 827 to output an air-fuel ratio signal corresponding to the air-fuel ratio of the exhaust gas. An oxygen sensor 829 is provided downstream of the catalytic converter 827. The output of the oxygen sensor 829 is reversed, depending on whether the air-fuel ratio of the exhaust gas is rich or lean.

The outputs of the individual sensors mentioned above are read into an electronic control unit (ECU) 830 via an input port 830. The ECU 830 is configured based on a microcomputer and includes a CPU 832, ROM 833, RAM 834 and backup RAM 835. Thus, as will be described later, the ECU 830 calculates a fuel injection amount TAU and an ignition timing Ig, for example, using engine operation condition parameters obtained from the outputs of the individual sensors, and outputs a signal based on the results of the calculation to the injectors 820*a* to 820*d* as well as the ignition circuit 822, via an output port 836.

The ECU 830 executes the program shown in FIG. 4 to also function as the catalyst early warm-up controlling means for performing early warm-up of the catalyzer 1 after engine start. The catalyst early warm-up controlling means (catalyst early warm-up control period) has a catalyst temperature raising means, which corrects lag angle of the ignition timing from the start of the catalyst early warm-up control, and permits the air-fuel ratio to be slightly lean ($1.0<\lambda\leq1.1$) to encourage temperature rise of the catalyzer 1.

Referring now to FIG. 4, hereinafter is explained the process flow of the early warm-up control routine.

The present routine is executed every expiration of a predetermined time (e.g., every 40 ms). First, at step S101, it is determined whether or not the engine cooling water temperature THW read from the water temperature sensor 838 is less than a predetermined perfect warm-up temperature T2. That is, it is determined, at step S101, whether or not the catalyst early warm-up control is necessary. The perfect warm-up temperature T2 refers to a temperature at which both of the engine 811 and the catalyzer 1 can be determined as being perfectly warmed up. For example, T2=60° C. If the engine cooling water temperature THW is lower than the perfect warm-up temperature T2, control proceeds to step S102 where a determination is made as to whether or not the temperature THW is not less than a predetermined warm-up control lower limit temperature T1. The warm-up control lower limit temperature T1 refers to a lower limit temperature which will not give adverse effects on the drivability in executing the catalyst early warm-up control. For example, T1=20° C.

If the engine cooling water temperature satisfies a relation THW$\geq$T1, control proceeds to step S103 where a determination is made as to whether or not the engine start has been completed, based on whether or not the engine speed satisfies a relation NE$\geq$500 RPM. If the engine start has been completed, control proceeds to step S104 to increment an after-start elapsed time counter CSTA. Then, at the subsequent step S105, it is determined whether or not the counter CSTA has fully counted a predetermined time period $\alpha$. The predetermined time period $\alpha$ refers to an ignition lag angle control time period which is required before the inside of the catalyzer 1 is warmed by the ignition lag angle control after the engine start, up to a temperature sufficient for causing HC components, in particular, to efficiently perform oxidation reaction.

If the after-start elapsed time counter CSTA has not fully counted the predetermined time period $\alpha$, control proceeds to step S106 where a catalyst temperature raising means enable flag FLG is set to "1" indicating execution of the ignition lag angle control. Thus the ignition lag angle control is executed/continued to end the present routine.

Then, when the counter CSTA has fully counted the predetermined time period $\alpha$, the catalyzer 1 is determined as having reached the catalyst temperature. Control then proceeds from step S105 to step S107 where the flag FLG is set to "0" indicating completion of the ignition lag angle control, to thereby put an end to the ignition lag angle control. Thus, the present routine is ended.

On the other hand, if the engine cooling water temperature THW is determined as being equal to or more than the perfect warm-up temperature T2, at step S101 explained above, it is determined that both of the engine 811 and the catalyzer 1 have been perfectly warmed up. Then, control proceeds to step S112 to carry out overflow prevention processing for the counter CSTA. At the subsequent step S114, the flag FLG is reset to "0" to inhibit the catalyst early warm-up control and end the present routine.

In short, when the engine is started in the state where the engine 811 and the catalyzer 1 have already been warmed up, such as when the period of engine stop before engine start has been short, the catalyst early warm-up control is not necessary or the warm-up time period can be shortened. Accordingly, comparing the temperature THW with the predetermined temperature T2, if THW$\geq$T2 is satisfied, the catalyst early warm-up control can be inhibited, whereby emission drivability and fuel consumption can be improved.

If a "No" determination is made at either of the previous steps S102 and S103, that is, if the temperature THW is lower than the predetermined lower limit temperature T1 (=20° C.), or if the engine speed NE is lower than 500 RPM, the engine revolution is unstable and the drivability will be adversely effected if the catalyst early warm-up control is carried out. In this case, control proceeds to step S133 to reset the after-start elapsed time counter CSTA. Then, at the subsequent step S114, the catalyst temperature raising means enable flag FLG is reset to "0" to inhibit the catalyst early warm-up control and end the present routine.

Referring to FIG. 5, hereinafter is described a process flow of a fuel injection amount calculation routine for calculating the final fuel injection amount TAU. The present routine is executed every 180° CA (every top dead point of the cylinders) to function as fuel injection amount calculating means. Upon start of the processes of the present routine, it is determined first, at step S121, whether or not the catalyst temperature 30 raising means enable flag FLG is set to "1" indicating the execution of the ignition lag angle control. If the flag FLG is set to "1", control proceeds to step S122 where leaning correction amount KLEAN is calculated based on a first map which is stored in the ROM 33 in the form of corresponding to the engine cooling water temperature THW. In this case, the leaning correction amount KLEAN is set to have a smaller value within a range of 0.9 to 1.0, as the temperature THW becomes higher.

Then, at the subsequent step S123, a basic fuel injection amount TP is calculated in a stoichiometric manner using the engine operation condition parameters. Then, at step S124, an ineffective injection time period TV is calculated.

In contrast, if the flag FLG is set to "0" at step S121 mentioned above, control proceeds to step S126 where the leaning correction amount KLEAN is rendered to be 1.0 to invalidate the correction, which is then followed by step S125.

At step S125, the final injection amount TAU is calculated based on the basic fuel injection amount TP, the ineffective injection time period TV and the cleaning correction amount KLEAN, using the following equation:

$$TAU=TP \times KLEAN+TV$$

Referring now to FIG. 6, hereinafter is described a process flow of an ignition timing calculation routine for calculating a final ignition timing AESA.

The present routine is executed every 180° CA (every top end point of the cylinders) to function as ignition timing calculating means. Upon start of the present routine, the engine speed NE is read first to determine, at step S141, whether or not the catalyst temperature raising enable flag FLG is set to "1" indicating the execution of the lag angle control. If the flag FLG is set to "1", control proceeds to step S142 where a lag angle amount KRET is calculated based on a second map which is stored in the ROM 33 in the form of corresponding to the engine cooling water temperature THW. In this case, the lag angle amount KRET is set to have a larger value within a range of 0 to 10° CA, as the temperature THW becomes higher.

At the subsequent step S143, a correction amount KRNE for correcting the lag angle amount KRET is calculated using a third map corresponding to the engine speed NE. It should be appreciated that the first, second and third maps are stored in the ROM 33. Then, at step S144, a final lag angle amount ARET is calculated based on the lag angle amount KRET and the correction amount KRNE, using the following equation, and control proceeds to step S145.

$$ARET=KRET \times KRNE$$

On the other hand, if the flag FLG is determined as being "0" at step S141 mentioned above, control proceeds to step S147 to inhibit correction, rendering the final lag angle amount ARET to be "0". Then, control proceeds to step S145.

At step S145, a basic ignition timing ABASE corresponding to the current NE is calculated based on a two-dimensional map of the engine speed NE. After that, at step S146, a final ignition timing AESA is calculated based on the basic ignition timing ABASE and the final lag angle amount ARET, using the following equation to end the present routine. It should be appreciated that the final ignition timing AESA is expressed by the angle of BTDC (before top dead point).

$$AESE=ABASE-ARET$$

As described above, in the present embodiment, with the application of the hexagonal-cell honeycomb catalyzer 1 to the emission purifying apparatus 8 of a vehicle engine, early warm-up of the catalyzer 1 can be ensured by the catalyst early warm-up control which is performed by the ignition lag angle control after engine start. Thus, the temperature of the three-way catalyst layer 5 of the catalyzer 1 can be raised early to a catalyst-active temperature. In this way, the harmful gas components, such as HC, CO and NOx, in the exhaust gas can be efficiently purified during engine start.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A hexagonal-cell honeycomb catalyzer for purifying an exhaust gas, the catalyzer comprising:
    a support that has a plurality of cells each sectioned by a wall, the support having an axial direction, each wall having a honeycomb-formed surface in section perpendicular to the axial direction, each cell being combined to each other as the support; and
    a purification layer that has
        an HC absorption layer which is formed on the honeycomb-formed surface of the wall to have a surface and which includes an HC absorbing material, the HC being included in the exhaust gas; and
        a three-way catalyst layer which is formed on the surface of the HC absorption layer and which includes a catalytic material,
    wherein, provided that the HC absorption layer has a thickness a1 and the three-way catalyst layer has a thickness b1 at a thin portion of the purification layer at which its thickness is minimum and the HC absorption layer has a thickness a2 and the three-way catalyst layer has a thickness b2 at a thick portion of the purification layer at which its thickness is maximum, a ratio of a1/b1 and a ratio of a2/b2 are both within a range of 1/20 to 5/1.

2. The hexagonal-cell honeycomb catalyzer of claim 1, wherein the thickness b1 of the three-way catalyst layer is 30 to 200 μm.

3. The hexagonal-cell honeycomb catalyzer of claim 2, wherein the thickness b2 of the three-way catalyst layer is 30 to 200 μm.

4. The hexagonal-cell honeycomb catalyzer of claim 2, wherein the catalytic material of the three-way catalyst layer contains one or more noble metals selected from platinum, rhodium, and palladium.

5. The hexagonal-cell honeycomb catalyzer of claim 2, wherein the HC absorbing material of the HC absorption layer is zeolite.

6. The hexagonal-cell honeycomb catalyzer of claim 2, wherein the HC absorption layer additionally contains an oxygen occlusion material.

7. The hexagonal-cell honeycomb catalyzer of claim 6, wherein the oxygen occlusion material is either cerium oxide or cerium/zirconium composite oxide.

8. The hexagonal-cell honeycomb catalyzer of claim 2, wherein the HC absorption layer contains alumina.

9. The hexagonal-cell honeycomb catalyzer of claim 2, wherein each hexagonal cell has a corner potion having a curved surface of a predetermined curvature.

10. The hexagonal-cell honeycomb catalyzer of claim 2, wherein the support is made of ceramics essentially made of cordierite.

11. The hexagonal-cell honeycomb catalyzer of claim 1, wherein the thickness b2 of the three-way catalyst layer is 30 to 200 μm.

12. The hexagonal-cell honeycomb catalyzer of claim 1, wherein the catalytic material of the three-way catalyst layer contains one or more noble metals selected from platinum, rhodium, and palladium.

13. The hexagonal-cell honeycomb catalyzer of claim 1, wherein the HC absorbing material of the HC absorption layer is zeolite.

14. The hexagonal-cell honeycomb catalyzer of claim 1, wherein the HC absorption layer additionally contains an oxygen occlusion material.

15. The hexagonal-cell honeycomb catalyzer of claim 14, wherein the oxygen occlusion material is either cerium oxide or cerium/zirconium composite oxide.

16. The hexagonal-cell honeycomb catalyzer of claim 1, wherein the HC absorption layer contains alumina.

17. The hexagonal-cell honeycomb catalyzer of claim 1, wherein each hexagonal cell has a corner potion having a curved surface of a predetermined curvature.

18. The hexagonal-cell honeycomb catalyzer of claim 1, wherein the support is made of ceramics essentially made of cordierite.

19. An emission purifying apparatus comprising:
   a catalyst for purifying an exhaust gas, the catalyst being arranged to an exhaust passage of an internal combustion engine;
   ignition timing calculation means for calculating an ignition timing based on an operated state of the internal combustion engine;
   fuel injection amount calculation means for calculating an amount of fuel to be injected based on the operated state of the internal combustion engine;
   warm-up detection means for detecting completion of a warm-up of the catalyzer; and
   catalyst early-warm-up control means for controlling, after start of the internal combustion engine, early warm-up of the catalyst until the warmed-up detection means detects the completion of the warm-up of the catalyst, wherein the catalyst early-warm-up detection means includes catalyst temperature rising means for accelerating temperature rise of the catalyst by correcting a delay angle of the ignition timing of the internal combustion engine from start of the catalyst early warm-up control,
   wherein
   the catalyst is composed of a hexagonal-cell honeycomb catalyzer for purifying an exhaust gas, the catalyzer comprising:
   a support that has a plurality of cells each sectioned by a wall, the support having an axial direction, each wall having a honeycomb-formed surface in section perpendicular to the axial direction, each cell being combined to each other as the support; and
   a purification layer that has
      an HC absorption layer which is formed on the honeycomb-formed surface of the wall to have a surface and which includes an HC absorbing material, the HC being included in the exhaust gas; and
      a three-way catalyst layer which is formed on the surface of the HC absorption layer and which includes a catalytic material,
   wherein, provided that the HC absorption layer has a thickness a1 and the three-way catalyst layer has a thickness b1 at a thin portion of the purification layer at which its thickness is minimum and the HC absorption layer has a thickness a2 and the three-way catalyst layer has a thickness b2 at a thick portion of the purification layer at which its thickness is maximum, a ratio of a1/b1 and a ratio of a2/b2 are both within a range of 1/20 to 5/1.

20. The emission purifying apparatus of claim 19, wherein the catalyst temperature rising means is configured to accelerate the temperature rise of the catalyst by correcting the delay angle of the ignition timing of the internal combustion engine from the start of control of the catalyst and having a slightly lean air-fuel ratio.

* * * * *